United States Patent [19]
Pelloni et al.

[11] Patent Number: 4,935,823
[45] Date of Patent: Jun. 19, 1990

[54] METHOD OF, AND APPARATUS FOR, IDENTIFYING A PREDETERMINED LOCATION WITHIN A DATA SEQUENCE ON A RECORD CARRIER FOR PROCESSING THE DATA SEQUENCE

[75] Inventors: Daniele Pelloni, Zürich; Alex Rüegg, Windisch; Marco Nai, Riazzino, all of Switzerland

[73] Assignee: Willi Studer AG, Regensdorf, Switzerland

[21] Appl. No.: 164,841

[22] Filed: Mar. 7, 1988

[30] Foreign Application Priority Data

Mar. 13, 1987 [CH] Switzerland ............... 00987/87

[51] Int. Cl.$^5$ ..................... G11B 5/00; G11B 27/02
[52] U.S. Cl. .................................. 360/13; 360/14.3
[58] Field of Search ........................ 360/13–14.3; 369/83

[56] References Cited

U.S. PATENT DOCUMENTS

| 4,211,997 | 7/1980 | Rudnick et al. ............... 371/38 |
| 4,351,007 | 9/1982 | Youngquist ..................... 360/13 |
| 4,467,371 | 8/1984 | Kobayashi et al. ............ 360/14.3 |
| 4,591,926 | 5/1986 | Gaskell et al. .................. 360/13 |
| 4,591,931 | 5/1986 | Baumeister ...................... 360/13 |
| 4,663,678 | 5/1987 | Blum ............................... 360/14.3 |
| 4,663,679 | 5/1987 | Sekiguchi et al. ............. 360/14.3 |
| 4,774,600 | 9/1988 | Baumeister ..................... 360/14.3 |

FOREIGN PATENT DOCUMENTS

| 0017803 | 10/1980 | European Pat. Off. . |
| 0142616 | 5/1985 | European Pat. Off. . |
| 1499757 | 7/1970 | Fed. Rep. of Germany . |
| 87/00958 | 2/1987 | PCT Int'l Appl. . |

Primary Examiner—Vincent P. Canney
Attorney, Agent, or Firm—Werner W. Kleeman

[57] ABSTRACT

The method and apparatus permits processing, for example, editing or synchronizing data sequences without using special marking devices and marking tracks for identifying preselected locations. For this purpose, a preselected partial data sequence is formed from a predetermined data sequence and serves as a reference partial data sequence. Such reference partial data sequence is utilized as a basis for comparison with further partial data sequences originating from the same or different data sequences for retrieving or identifying operations in connection with, for example, the joining, inserting or synchronizing of data sequences.

18 Claims, 6 Drawing Sheets

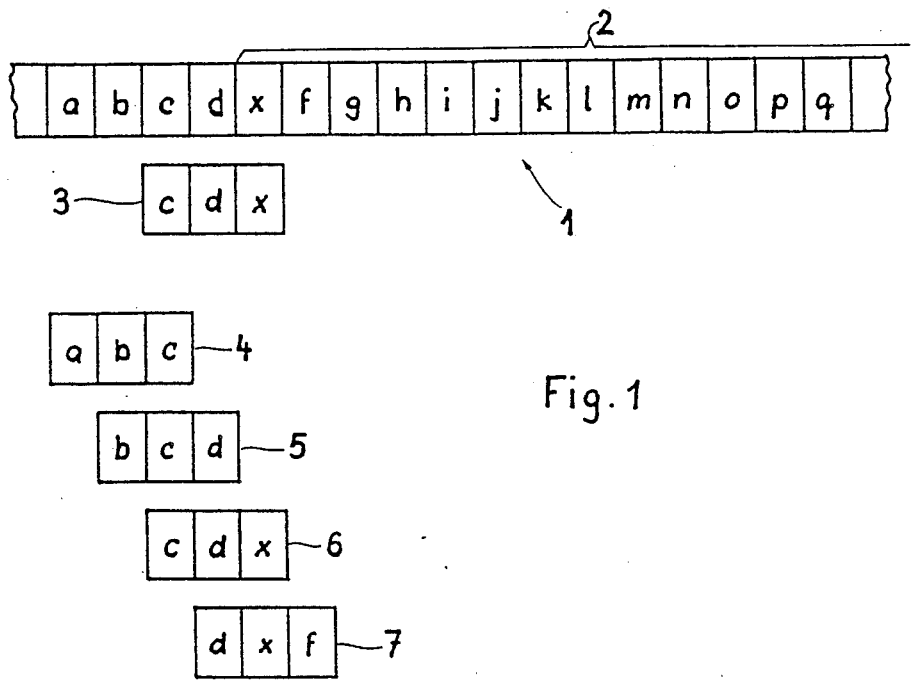
Fig. 1
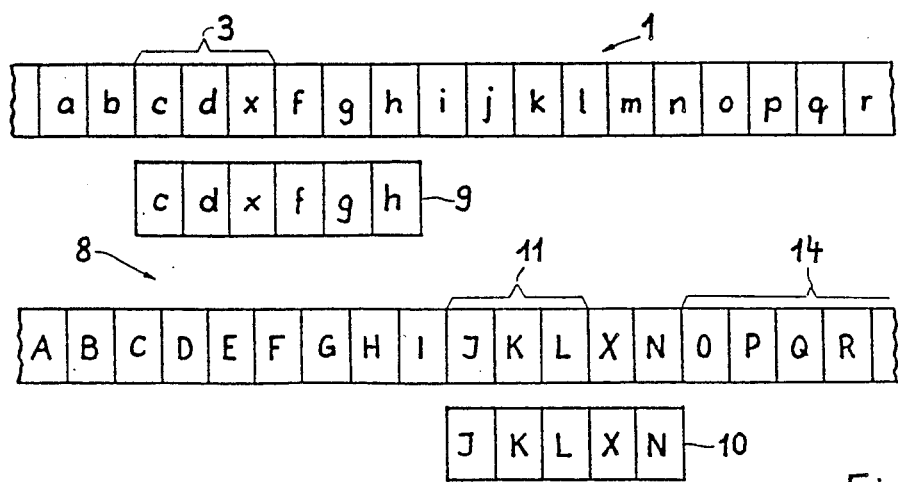
Fig. 2
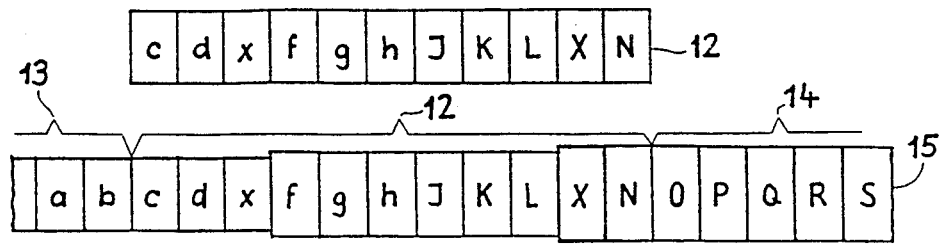

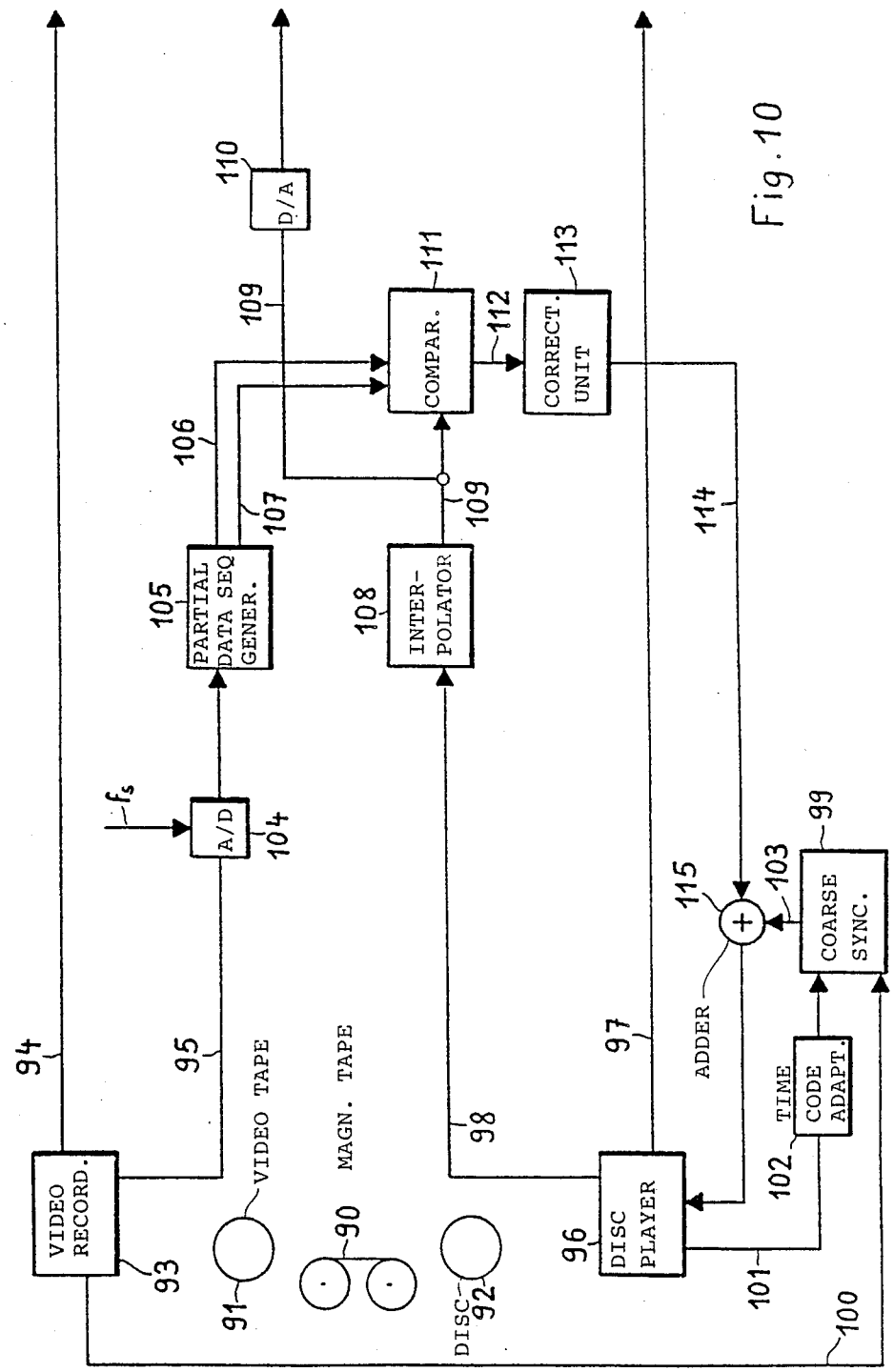

METHOD OF, AND APPARATUS FOR, IDENTIFYING A PREDETERMINED LOCATION WITHIN A DATA SEQUENCE ON A RECORD CARRIER FOR PROCESSING THE DATA SEQUENCE

BACKGROUND OF THE INVENTION

The present invention relates to a new and improved method of, and apparatus for, processing at least one data sequence recorded on at least one record or data carrier.

A method and apparatus of such type as known, for example, from U.S. Pat. No. 4,591,926, granted May 27, 1986, processes digitized audio signals which are recorded on magnetic tape. The processing of the recorded digitized audio signals particularly concerns editing, i.e. joining different portions of the recorded sequences of scanned values or data of the type as formed upon digitizing analog audio signals. However, also other processing operations like, for example, the synchronization of digitized signals and other data processing operations are to be understood to be covered by the term "processing".

In order to process the aforementioned sequences of scanned values or data or data sequences, it is again and again required that predetermined locations in such data sequence or predetermined scanned values or data of such data sequence be marked in order to enable later retrieval or identification of such predetermined locations or predetermined scanned values or data. In accordance with the aforementioned U.S. Pat. No. 4,591,926, this is effected using markings which are applied to the record carrier on which there is recorded the data sequence to be processed. It is also known that such locations can be marked by means of time code data which are associated with such predetermined locations or data.

During editing in accordance with the aforementioned known method, a first location is marked at the record carrier carrying a first data sequence. A second location is marked at a second record carrier carrying a second data sequence. Thereafter the two data sequences are joined at the marked locations.

It is one disadvantage of such method for processing data sequences or portions of data sequences that special means must be provided in order to mark the locations along the record carriers on which the data sequences are recorded. Such special marking means preferably comprise an individual track which is associated with the data track on which each data sequence is recorded.

SUMMARY OF THE INVENTION

Therefore, with the foregoing in mind it is a primary object of the present invention to provide a new and improved method of, and apparatus for, processing at least one data sequence recorded on at least one record or data carrier and which method and apparatus are not afflicted with the aforementioned drawbacks and limitations of the prior art heretofore discussed.

A further significant object of the present invention is directed to the provision of a new and improved method of, and apparatus for, processing at least one data sequence recorded on at least one record or data carrier in such a manner that the processing of partial data sequences is possible in the most simple manner without requiring further or external data which are associated with each data sequence.

Now in order to implement these and still further objects of the invention, which will become more readily apparent as the description proceeds, the method of the present development is manifested by the features that, a first or reference partial data sequence containing a predetermined number of data is formed from the at least one data sequence and a predetermined number of further partial data sequences containing a predetermined number of data are formed from the at least one data sequence. The first or reference partial data sequence is compared with the predetermined number of further partial data sequences and this comparison permits determining from the predetermined number of further partial data sequences a selected further partial data sequence containing a predetermined number of data which conform to the greatest possible extent with the predetermined number of data of the first or reference partial data sequence.

As alluded to above, the present invention is not only concerned with the aforementioned method aspects, but also relates to a novel construction of an apparatus for carrying out the same.

To achieve the aforementioned measures, the inventive apparatus, in its more specific aspects, comprises:

means for forming a first or reference partial data sequence as well as a predetermined number of further partial data sequences;

means for storing the first or reference partial data sequence as well as the predetermined number of further partial data sequences; and means for comparing the first or reference partial data sequence and the predetermined number of further partial data sequences with each other and for determining selected further partial data sequences which correspond or substantially conform to the first or reference partial data sequence.

It is one essential advantage which is achieved by the invention, that it is now possible to join two sequences of scanned values or data or data sequences precisely either at a predetermined scanned value or datum or intermediate two predetermined scanned values or data. In this manner, there can be avoided the double occurrence of the same scanned value or datum in the transition region between the two data sequences. There is thus achieved a precise transition between the two data sequences.

Quite generally, the present invention enables retrieving predetermined locations or data which are recorded on a record or data carrier without the use of any additional marks or markings and the associated marking means. Consequently, the inventive apparatus can also be used for synchronizing digital data sequences.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 1 is a schematic diagram illustrating a first exemplary embodiment of the inventive method and shows a portion of a data sequence and a number of partial data sequences formed from such data sequence;

FIG. 2 is a similar diagram illustrating a second exemplary embodiment of the inventive method and shows the formation of sections from two data sequences which include predetermined partial data sequences and are joined for combining the two data sequences;

FIG. 10 is a schematic block circuit diagram of a second exemplary embodiment of the inventive apparatus for synchronizing two record or data carriers which contain two recorded data sequences.

DETAILED DESCRIPTION OF THE PREFERRED EMBODIMENTS

Figure 3:
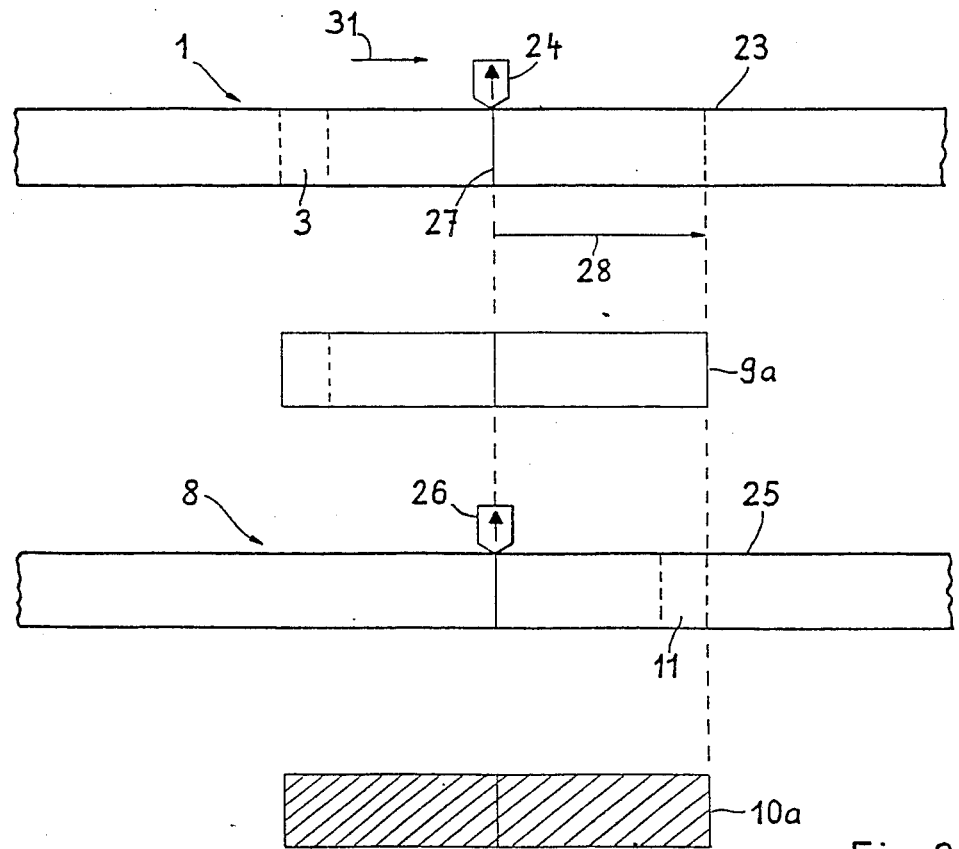
FIG. 3 is a schematic diagram illustrating a manner or technique for carrying out the method as shown in FIG. 2.
Figure 3:
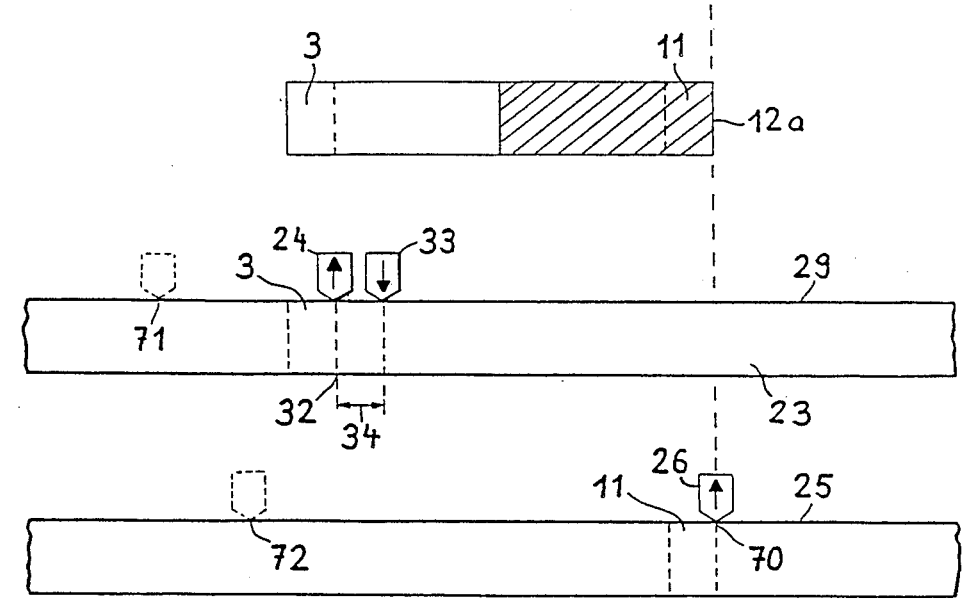

Describing now the drawings, it is to be understood that only enough of the inventive method of processing data sequences and the construction of the inventive apparatus have been shown as needed for those skilled in the art to readily understand the underlying principles and concepts of the present development, while simplifying the showing of the drawings. Turning attention now specifically to FIG. 1 of the drawings, there is illustrated therein by way of example and not limitation a scanned value or data sequence 1 which, for example, is recorded on a conventional record or data carrier. The individual scanned values or data which, for example, represent the amplitude values of an audio signal at predetermined moments of time and which are shown only in a portion of the record carrier, are designated by the reference characters a, b, c, d, x, f, g, h, i, j, k, l, m, n, o, p, q and so forth. A bracket is designated by the reference character 2 and indicates which portion of the data sequence 1 is intended to be processed. Such portion indicated by the bracket 2 starts with the scanned value or datum x.

There will also be recognized in FIG. 1 a first or reference partial data sequence 3 containing a predetermined number of scanned values or data, for example, the scanned values or data c, d and x. Also, there are shown a predetermined number of further partial data sequences each of which contains a predetermined number of data, such as the further partial data sequence 4 containing the scanned values or data a, b and c, the further partial data sequence 5 containing the scanned values or data b, c and d, the further partial data sequence 6 containing the scanned values or data c, d and x as well as the still further partial data sequence 7 containing the scanned values or data d, x and f. When carrying out a first exemplary embodiment of the inventive method, the further partial data sequences 4, 5, 6 and 7 are subjected to a comparison with the first or reference partial data sequence 3.

During processing of the data sequence 1 it is, for example, intended to preselect or identify a predetermined location or a predetermined scanned value or datum in such data sequence 1. The scanned value or datum x is assumed to constitute such predetermined scanned value or datum which appears at a predetermined location of the record or data carrier on which the data sequence 1 is recorded. In this particular case, the first or reference partial data sequence 3 is formed with the inclusion of the scanned value or datum x which is then stored in suitably selected storage means.

If it is intended to retrieve or identify this scanned value or datum x within the data sequence 1 at a later time, then, the entire data sequence 1 or at least that preselected portion thereof which is supposed to contain the desired scanned value or datum x, is read into storage means and therein the entire data sequence 1 or the preselected portion thereof is decomposed or segmented into a predetermined number of further partial data sequences 4, 5, 6, 7 and so forth. Preferably, such further partial data sequences comprise the same number of scanned values or data as the first or reference partial data sequence 3.

Thereafter, each further partial data sequence 4, 5, 6, 7 and so forth is compared with the first or reference partial data sequence 3. This comparison is effected in conventional manner by, for example, comparing the first scanned value or datum a of the further partial data sequence 4 with the first scanned value or datum c of the first or reference partial data sequence 3, the second scanned value or datum b of the further partial data sequence 4 with the second scanned value or datum d of the first or reference partial sequence 3, and the third scanned value or datum c of the further partial data sequence 4 with the third scanned value or datum x of the first or reference partial data sequence 3.

In case all of the three scanned values or data of the further partial data sequence 4 are equal to the scanned values or data present in the first or reference partial data sequence 3, the two partial data sequences 3 and 4 are identical. If such equality is found during the comparing or comparison operation between the first or reference partial data sequence and a selected one of the predetermined number of further partial data sequences 4, 5, 6, 7 and so forth, the desired scanned value or datum has been retrieved or identified and conjointly therewith the desired location. This is so because the reading head which reads the record or data carrier has just read the further partial data sequence 6 and is positioned at the end of this further partial data sequence 6 along the length of the record carrier on which the data sequence 1 is recorded.

The illustration of FIG. 2 schematically illustrates a second exemplary embodiment of the inventive method in a manner which is similar to the illustration of FIG. 1. There is shown a first data sequence 1 which is present on an associated record or data carrier and contains the scanned values or data a, b, c, d, x, f, g, h, i, j, k l, m, n, o, p, q and r. A second data sequence 8 is present on a different record carrier and contains the scanned values or data A, B, C, D, E, F, G, H, I, J, K, L, X, N, 0, P, Q, and R. A first section 9 taken from the first data sequence 1 is composed of the scanned values or data c, d, x, f, j and h. A second section 10 taken from the second data sequence 8 contains the scanned values or data J, K, L, X and N. The first section 9 originating from the first data sequence 1 contains the aforementioned first reference partial data sequence comprising the scanned values or data c, d and x. The second section 10 originating from the second data sequence 8 contains a second reference partial data sequence 11 comprising the scanned values or data J, K and L.

A third section 12 of data is formed by joining the first section 9 originating from the first data sequence 1 and the second section 10 originating from the second data sequence 8. A resultant data sequence 15 is obtained by adjoining a portion 13 of the first data sequence 1 and a portion 14 of the second data sequence 8 with the interposition of the third section 12 which originated from the combination of the first section 9 taken from the first data sequence 1 and the second section 10 taken from the second data sequence 8.

The processing of the first data sequence 1 and the second data sequence 8 may entail, for example, joining a portion of the first data sequence 1 which, for example, terminates with the scanned value or datum h, and a portion of the second data sequence 8 which, for example, starts with the scanned value or datum J. During such joining operation care must be taken in order to prevent (i) the loss of any individual significant scanned values or data and (ii) the occurrence of an empty space between the two respective portions 13 and 14 of the first data sequence 1 and the second data sequence 8. In order to ensure such proper joining operation, a preselected scanned value or datum is preselected in each one of the two respective portions 13 and 14 of the first data sequence 1 and the second data sequence 8 which are intended to be joined. In the illustrated example, these preselected scanned values or data are the scanned value or datum x in the first data sequence 1 and the scanned value or datum X in the second data sequence 8.

During the joining operation, there is formed from the first data sequence 1 the first section 9 which ends with the scanned datum or value h and contains the preselected scanned value or datum x. The second section 10 is formed from the second data sequence 8 and contains the starting scanned value or datum J as well as the preselected scanned value or datum X. The sections 9 and 10 are now joined in conventional manner externally of the first data sequence 1 and the second data sequence 8, for example, by utilizing an appropriately selected storage means such that the scanned values or data h and J directly follow each other. There is thus formed the third section 12. This third section 12, then, is added to the first data sequence 1 in a manner such that the scanned value or datum x in the first data sequence 1 coincides with the scanned value or datum x in the third section 12. Subsequently, the second data sequence 8 is added to the third section 12, which previously was combined with the first data sequence 1, in a manner such that the scanned value or datum X in the third section 12 coincides with the scanned value or datum X in the second data sequence 8. Under these conditions it is also ensured that the scanned values or data h and J precisely follow each other.

Further different steps for carrying out this second embodiment of the inventive method of processing data sequences will now be explained with reference to FIGS. 1 through 4.

Figure 4:
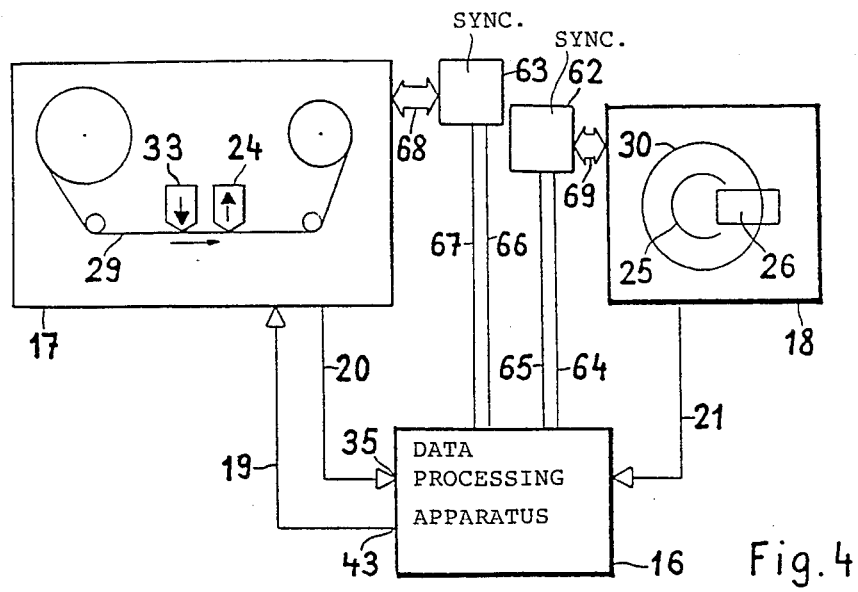
FIG. 4 is a schematic block circuit diagram illustrating the use of an exemplary embodiment of the inventive apparatus for carrying out the methods as shown in FIGS. 1 through 3.
Figure 5:
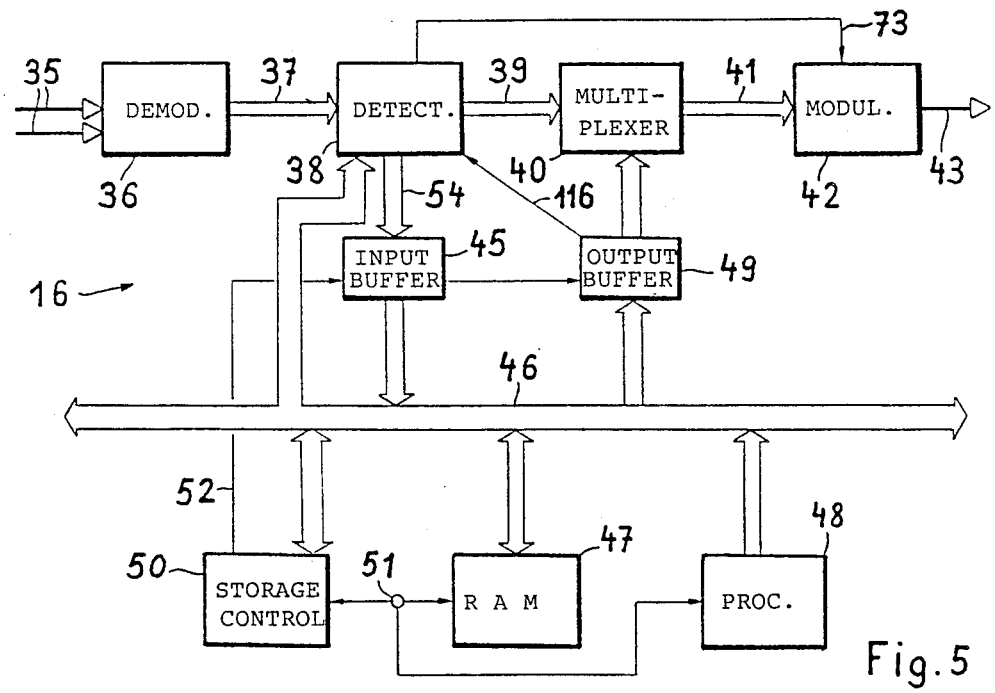
FIG. 5 is a schematic block circuit diagram of a first exemplary embodiment of the inventive apparatus.
Figure 6:
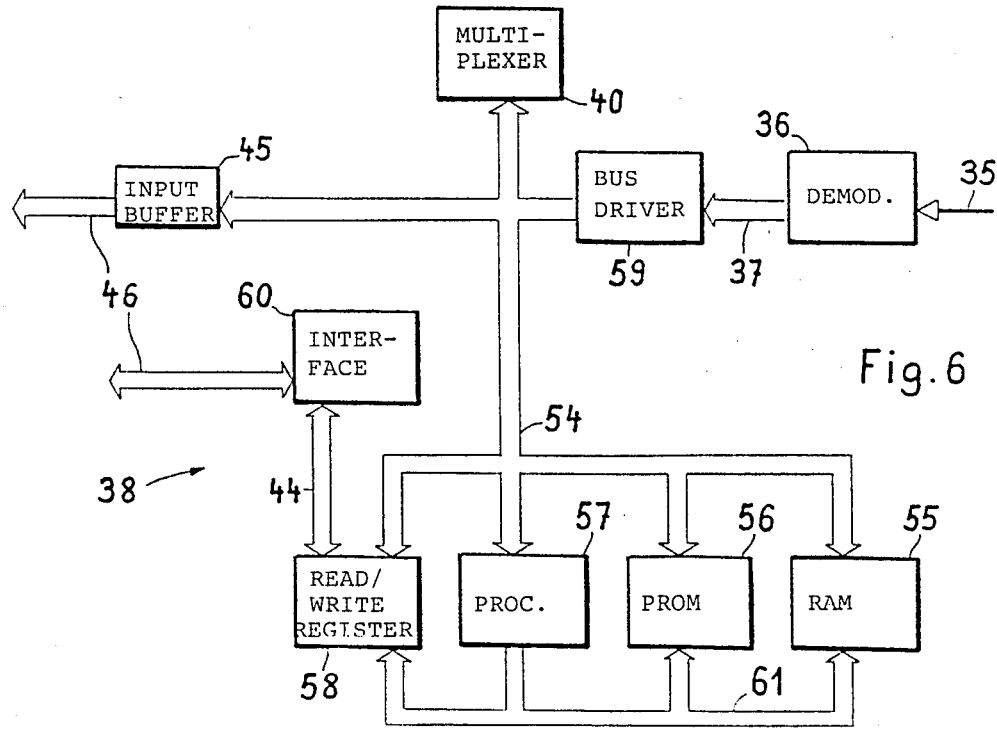
FIG. 6 is a schematic block circuit diagram of a detail of the inventive apparatus illustrated in FIG. 5.

FIG. 4 is a schematic block circuit diagram illustrating the use of an exemplary embodiment of the inventive apparatus 16 for processing portions of sequences of scanned values or data sequences in combination with a recording and reproducing device 17 for digital data and a reproducing device 18 for reproducing digital data. The inventive data processing apparatus 16, the recording and reproducing device 17 and the reproducing device 18 are interconnected by respective lines or conductors 19, 20 and 21. The structural and functional details of the inventive apparatus 16 will be described further hereinbelow with reference to a first exemplary embodiment which is shown in FIGS. 5 and 6.

Assuming that the first data sequence and the second data sequence to be processed are of the type as described hereinbefore with reference to FIG. 2 and are recorded, for example, on magnetic tape or storage discs, the method described hereinbelow in FIG. 2 and for joining a portion of the first data sequence 1 and a portion of the second data sequence 8 can be carried out as described hereinbelow. As illustrated in FIGS. 3 and 4, the first data sequence 1 is assumed to be recorded on the track 23 of a record or data carrier 29 and this track 23 can be read by means of a reading head 24 of the recording and reproducing device 17. In analogous manner, the second data sequence 8 is recorded on a track 25 of a second record or data carrier 30 which can be read by means of a reading head 26 of the reproducing device 18.

In the first step of the procedure, the end of the first data sequence 1 is identified. For this purpose, the reading head 24 of the recording and reproducing device 17 reads the first data sequence 1 on the first record carrier 29. If the end of the first data sequence 1 has been recognized at the location 27, as shown at the top of FIG. 3, for example, by monitoring the scanned values or data after reconversion into an analog audio signal, the reading operation can be interrupted at a predetermined later moment of time which is defined by the distance 28 on the track 23 of the record carrier 29. During such operation, the read scanned values or data are continuously read, in the inventive apparatus 16, into an appropriately selected memory or storage means which is organized according to the First in, First out (FIFO) principle and which receives such read scanned values or data from the reading head 24 via the line or conductor 20. The capacity of the memory or storage means is selected to be greater than the number of scanned values or data which correspond to the distance 28 on the track 23 of the record carrier 29. As a consequence, there are also stored scanned values or data which precede the location 27 or which are located to the left thereof in the illustration of FIG. 3 when the reading operation is interrupted. The FIFO storage means, then, store scanned values or data which define a first section 9a.

Thereafter, the start of the related portion of the second data sequence 8 is detected. For this purpose, the second data sequence 8 is read from the track 25 on the record carrier 30 by means of the reading head 26 of the reproducing device 18. The thus read scanned values or data are read into the FIFO memory or storage means via the line or conductor 21 as illustrated in FIG. 4. In analogous manner as described hereinbefore with reference to the first data sequence 1, a second section 10a is formed from the second data sequence 8 on the track 25 of the record carrier 30. During this operation the reading head 24 moves relative to the track 23 of the record carrier 29 and the reading head 26 moves relative to the track 25 on the record carrier 30.

The scanned values or data of the first section 9a are then read from the FIFO memory or storage means into a further storage means; such operation on the first section 9a is carried out with the exception of those scanned values or data which correspond to the distance 28. The scanned values or data of the second section 10a are read from the FIFO memory or storage means into the further storage means; this operation is carried out with the exception of those scanned values or data which are located outside the distance 28. There is thus formed the third section 12a. Such third section 12a contains the scanned values or data which are associated with the first data sequence 1 up to the location 27 and the scanned values or data of the second data sequence 8 starting from the location which corresponds to the location 27 in the first data sequence or on the first record carrier 29.

A preselected number of the scanned values or data which form the third section 12a and which were stored in the FIFO memory or storage means, namely the first read-in scanned values or data which originated from the first section 9a of the first data sequence 1 on the first record carrier 29, are designated as the first or reference partial data sequence 3. A preselected number of those scanned values or data which form the third section 12a and which were stored in the related FIFO memory or storage means, namely the last read-in scanned values or data which originated from the second section 10a of the second data sequence 8 on the second record carrier 30, are designated as the second reference partial data sequence 11. Such preselection or identification is performed, for example, by separately filing the associated storage addresses. In this manner, the third section 12a is ready for further processing in the FIFO memory or storage means.

In order to add the third section 12a to the first data sequence 1, the first record carrier 29 is moved past the reading head 24 of the recording and reproducing device 17 or vice versa, see the bottom part of FIG. 3. There are now continuously formed in the manner as described hereinbefore, the further partial data sequences 4, 5, 6, 7 and so forth which are continuously compared with the first reference partial data sequence 3. When the reading head 24 arrives at the location designated by the reference character 32, the position of the first reference partial data sequence 3 is recognized on the first record carrier 29. Immediately thereafter, a portion of the third section 12a is started to be written over from the FIFO memory or storage means onto the first record carrier 29 by means of the recording or writing head 33 of the recording and reproducing device 17. For such operation, the spacing 34 between the reading head 24 and the writing or recording head 33 must be taken into account. Therefore, the start of the read-out operation from the FIFO memory or storage means is shifted from the storage address associated with the location 32 by a predetermined number of storage addresses to a storage address associated with the instant starting position of the recording or writing head 33, i.e. this predetermined number of storage addresses corresponds to the spacing 34 on the first record carrier 29. The stored scanned values or data of the third section 12a are now delivered from the FIFO memory or storage means of the inventive apparatus 16 via the conductor or line 19 to the recording and reproducing device 17 which has been switched to the recording mode.

Furthermore, there must be adjoined the second data sequence 8 to the third section 12a. For this purpose, the reading head 26 of the reproducing device 18 and which reading head 26 is associated with the track 25 of the second record carrier 30 on which the second data sequence 8 is recorded, is moved relative to the track 25 to a standby position 70 which is located at the end of the second reference partial data sequence 11. This is effected in the manner already described hereinbefore with reference to the first data sequence 1 on the first record carrier 29, by recognizing or identifying the second reference partial data sequence 11 in the second data sequence 8. When the recording or writing head 33 of the recording and reproducing device 17 has recorded the last scanned value or datum of the third section 12a from the FIFO memory or storage means, this recording or writing head 33 receives scanned values or data which are supplied by the reading head 26 from the second record carrier 30. As a result, the remaining portion 14 of the second data sequence 8 is added to the third section 12a.

Instead of starting the reading head 26 of the reproducing device 18 from the location 70 on the second record carrier 30, it is also possible, for example, to synchronously move the two reading heads 24 and 26, starting from the locations 71 and 72. In this mode of operation, the reading head 26 of the reproducing device 18 should lead the reading head 24 of the recording and reproducing device 17. The thus given spacing between the reading heads 24 and 26 corresponds to a predetermined amount of data which are continuously intermediately stored or buffered in a suitably selected storage means. This predetermined amount of data must be smaller than the amount of data which form the third section 12a. This particular mode of operation will still be described more precisely further hereinbelow.

The inventive apparatus 16 which is only schematically indicated in FIG. 4, is shown with respect to its essential components in the schematic block circuit diagram of FIG. 5. The lines or conductors 20 and 21 which respectively interconnect the inventive apparatus 16 and the recording and reproducing device 17 and the reproducing device 18, lead to inputs 35 which are shown in FIG. 5 and constitute digital signal inputs. The inputs 35 are connected to a conventional AES/EBU demodulator 36 which is constructed and organized in accordance with the data format as agreed to by the Audio Engineering Society (AES) and the European Broadcasting Unit (EBU), and which converts the serially arriving signals, i.e. the scanned values or data, for example, into 16-bit scanned values or data. The AES-/EBU demodulator 36 is connected via a bus 37 to a detector 38 which, in turn, is connected to a multiplexer 40 via a bus 39. A further bus 41 connects the multiplexer 40 to a conventionally constructed AES/EBU modulator 42 which is also connected to an output 43 of the inventive apparatus 16 and which is also constructed and organized in accordance with the data format as agreed to by the Audio Engineering Society and the European Broadcasting Unit.

The detector 38 is connected via a bus 54 to an input intermediate FIFO storage or buffer 45 which, in turn, is connected via a bus 46 to a random-access memory or RAM 47, a processor 48 and an output intermediate FIFO storage or buffer 49. Storage control means or storage control 50 are provided and connected via a line or conductor 51 to the random-access memory 47 and via a line or conductor 52 with the input and output intermediate FIFO storages or buffers 45 and 49. The storage control means or storage control 50 is also connected with the bus 46. The respective input and output intermediate FIFO storages or buffers 45 and 49 are constructed such as to be operable in accordance with the FIFO principle. The random-access memory 47 comprises a random-access memory which is organized according to the FIFO principle for having an increased storage capacity and corresponds to the appropriately selected FIFO memory or storage means mentioned hereinbefore with reference to the second embodiment of the inventive method explained in connection with FIG. 2. Such random-access memory 47 and the storage control 50 conjointly define generating means for forming a first or reference partial data sequence and a predetermined number of further partial data sequences from at least one data sequence, storage means for storing the first or reference partial data sequence and the predetermined number of further partial data sequences, and comparator means for comparing the first or reference partial data sequence and the predetermined number of further partial data sequences for determining from the predetermined number of further partial data sequences, a selected further partial data sequence which substantially conforms with the first or reference partial data sequence, as will be explained further hereinbelow with reference to the mode of operation of the inventive apparatus 16.

With the exception of the digital data inputs 35, the aforementioned AES/EBU demodulator 36, the bus 37, the input intermediate FIFO storage or buffer 45 and the bus 46 which have already been described hereinbefore with reference to FIG. 5, FIG. 6 shows the essential construction of the detector 38 in a schematic block circuit diagram. Such detector 38 comprises a bus 54 and, connected thereto, a FIFO random-access memory 55, a programmable read-only memory or PROM 56, a processor 57, a read-write register 58, a bus driver 59, and a further bus 44 for connecting the read-write register 58 and an interface 60. The bus 44 interconnects the read-write register 58 and an interface 60 in the connection between the detector 38 and the bus 46. The bus 54 of the detector 38 also leads to the input intermediate FIFO storage or buffer 45 and the bus driver 59 governs the interconnection between the detector 38 and the AES/EBU demodulator 36 via the bus 37. Furthermore, the FIFO random-access memory 55, the programmable read-only memory 56, the processor 57 and the read-write register 58 are connected to a common address bus 61.

In the following, there will now be described the method as more generally described hereinbefore with reference to FIGS. 1 through 4 when carried out using the inventive apparatus illustrated in FIGS. 4 to 6.

The scanned values or data in the first data sequence 1 and the scanned values or data in the second data sequence 8 are respectively read from the associated tracks 23 and 25 on the respective first and second record or data carriers 29 and 30 by means of the respective reading heads 24 and 26. The thus read scanned values or data are infed to the inputs 35 via the lines or conductors 20 and 21. Such read scanned values or data originating from the first data sequence 1 and the second data sequence 8 are infed through the AES/EBU demodulator 36 and the bus 37 into the detector 38. As a consequence, these read scanned values or data are read-in into the random-access memory 47 via the bus 37, the bus driver 59, the bus 54, the input intermediate FIFO storage or buffer 45 and the bus 46. The scanned values or data which have been read-in into the random-access memory 47, are stored therein for a predetermined fixed dwell time. This dwell time is selected to correspond to approximately twice the time duration or period associated with the distance 28 on the first record carrier 29, i.e. the time required by the first record carrier 29 for travelling the distance 28.

The first section 9a and the second section 10a are detected by means of the detector 38 during this read-in operation and separately stored in the random-access memory 47. The aforedescribed components comprise the aforementioned generating means which separate or extract the first section 9a associated with the first data sequence 1 on the first record carrier 29 and containing the first partial data sequence 3 as well as separate or extract the second section 10a associated with the second data sequence 8 on the second record carrier 30 and containing the second reference partial data sequence 11. The random-access memory 47 constitutes storage means connected to the generating means and storing the first section 9a and the second section 10a which have been separated or extracted from the first data sequence 1 and the second data sequence 8.

The storage control 50 is suitably programmed for further processing the first and second sections 9a and 10a of the respective first and second data sequences 1 and 8 and which sections 9a and 10a are stored in the random-access memory 47. The commands originating from the storage control 50 are supplied to the random-access memory 47 via the line or conductor 51. Thus, for example, the stored first and second sections 9a and 10a can be combined in a manner such that there is formed the third section 12a. Such combination, for example, may also be effected in the manner of a continuous transition or crossfade between the two sections 9a and 10a. This can be simply achieved by multiplying all of the scanned values or data associated with the first section 9a and the second section 10a, which are stored in the random-access memory 47, with a sequence of multiplying factors and subsequently adding two respective ones of the thus obtained products in order to thereby generate the third section 12a. Reference is made in this respect to the commonly assigned U.S. patent application Ser. No. 06/774,005, filed Sept. 9, 1985, now U.S. Pat. No. 4,780,892, granted Oct. 25, 1988.

As already described hereinbefore with reference to FIG. 3, the first reference partial data sequence 3 and the second reference partial data sequence 11 are contained in the third section 12a and are defined or identified by predetermined storage locations or at least by their associated storage addresses in the random-access memory 47. The scanned values or data or at least the associated storage addresses which are associated with the first reference partial data sequence 3 and the second reference partial data sequence 11, are transferred via the bus 46 from the random-access memory 47 to the memory of the processor 48 of the first embodiment of the inventive apparatus 16.

In order to add the scanned values or data of the third section 12a to the scanned values or data of the first data sequence 1 on the track 23 of the first record carrier 29 in the recording and reproducing device 17, the contents of the random-access memory 47 must be synchronized with the scanned values or data which are present on the track 23 of the first record carrier 29. From the foregoing steps of the procedure it is known which one of the scanned values or data in the third section 12a, which is stored in the random-access memory 47, is intended to be recorded as the first scanned value or datum on the track 23 of the first record carrier 29. This first value is determined by starting from the last scanned value or datum of the first reference partial data sequence 3 and adding thereto a predetermined number of storage locations for scanned values or data. This predetermined number of storage locations precisely corresponds to the spacing or distance 34 between the reading head 24 and the recording or writing head 33 of the recording and reproducing device 17. The storage address of this scanned value or datum to be recorded first thus is also known and, consequently, this scanned value or datum to be recorded first and subsequently the further scanned values or data to be recorded can be advanced via the bus 46, the output intermediate FIFO storage or buffer 49, the multiplexer 40 and the bus 41 to the AES/EBU modulator or interpolator-modulator 42. The scanned value or datum to be recorded first is available in the AES/EBU modulator or interpolator-modulator 42 for the further steps of the data processing operation.

For carrying out such further steps of the data processing operation, the reading head 24 of the recording and reproducing device 17 and which is associated with the first record carrier 29 containing the first data sequence 1, is placed into a starting position 71. A data reading operation on the first record carrier 29 is started at this starting position 71. The thus read scanned value or data are infed into the detector 38 via the line or conductor 20, the input 35 and the other precedingly mentioned components. In the detector 38, the scanned values or data read by the reading head 24, are supplied to the processor 57. In this processor 57 the further partial data sequences like, for example, the further partial data sequences 4, 5, 6, 7 and so forth as described hereinbefore with reference to FIG. 1, are formed from the read-in first data sequence 1 which is read out from the first record carrier 29.

The first reference partial data sequence 3 is read-out from the random-access memory 47 via the bus 46 and is also infed into the processor 57 of the detector 38 via the interface 60, the bus 44, the read-write register 58, and the bus 54. In the processor 57 of the detector 38, the further partial data sequences formed from the first data sequence 1, are compared with the first reference partial data sequence in the manner described hereinbefore with reference to FIGS. 2 and 3 in order to retrieve or identify the selected further partial data sequence which substantially conforms with the first reference partial data sequence 3. The detector 38 releases the AES/EBU modulator or interpolator-modulator 42 via the line or conductor 73 when the selected further partial data sequence like, for example, the further partial data sequence 6 in the illustration of FIG. 1 has been recognized or identified. As a result, the AES/EBU modulator or interpolator-modulator 42 transmits the scanned values or data of the third section 12a and which have been transferred from the random-access memory 47 to the output intermediate FIFO storage or buffer 49 as mentioned hereinbefore, via the output 43 and the line or conductor 19 to the recording or writing head 33 of the recording and reproducing apparatus 17 whereby the scanned values or data associated with the third section 12a are recorded on the track 23 of the first record or data carrier 29.

During the course of the operational steps described hereinbefore, a further reading operation is started at the reading head 26 of the reproducing device 18, for example, from a predetermined starting position 72 at the track 25 on the second record carrier 30 which is associated with the second data sequence 8. Preferably, the relative movement of the reading head 26 associated with the reproducing device 18 is synchronized with the relative movement of the recording or writing head 33 of the recording and reproducing device 17 in a manner such that the reading head 26 leads the recording or writing head 33. This synchronization is effected in conventional manner using synchronizers 62 and 63 which are illustrated in FIG. 4 and which are respectively connected to the reproducing device 18 and the recording and reproducing device 17 by buses 69 and 68. Such synchronizers 62 and 63 are also connected with the inventive apparatus 16 via respective lines or conductors 64, 65 and 66, 67 in order to exchange time code data and further control data and commands. In this manner, the speed of relative movement of the reading head 26 and the recording or writing head 33 can be precisely maintained. The reading head 26 and the recording or writing head 33 thus also maintain a predetermined or fixed mutual spacing.

The scanned values or data which are received by the reading head 26 from the second data sequence 8 on the track 25 of the second data carrier 30, are conducted to the detector 38 via the line or conductor 21, the input 35 and the other components of the inventive apparatus 16 and are passed to the FIFO random-access memory 55 in the detector 38. Partial data sequences are continuously taken from the FIFO random-access memory 55 and supplied via the bus 54 to the processor 57. The second reference partial data sequence 11 is now applied to the processor 57 from the random-access memory 47 in the aforedescribed manner via the read-write register 58. The processor 57 continuously compares the second reference partial data sequence 11 with the continuously formed further partial data sequences in the manner as described hereinbefore for the first reference partial data sequence 3 and the further partial data sequences continuously formed from the first data sequence 1.

When the reading head 26 of the reproducing device 18 assumes the position 70, the further partial data sequence of the second data sequence 8 which is recorded on track 25 of the second record carrier 30 and which is found to substantially conform with the second reference partial data sequence 11, is recognized or identified. There is thus also recognized or identified the first scanned value or datum of the second data sequence 8 by means of its storage address in the FIFO random-access memory 55. During this operation, the scanned values or data associated with the third section 12a, which have been infed into the FIFO random-access memory 55 of the detector 38 from the FIFO random-access memory 47, are still read-out from the FIFO random-access memory 55 and recorded on the track 23 of the first record carrier 29. At the moment of time at which the stored scanned values or data which are associated with the third section 12a, have been read out from the FIFO random-access memory 55 of the detector 38, i.e. at the time at which the last scanned value or datum arrives at the output intermediate FIFO storage or buffer 49, the scanned values or data which originate from the track 25 on the second record carrier 30, are read-out, beginning with the aforementioned recognized or identified first scanned value or datum, and recorded onto track 23 of the first record carrier 29. This is effected by means of a signal which is supplied by the output intermediate FIFO storage or buffer 49 via a line or conductor 116 to the detector 38. It becomes thus possible to carry out this transition from the last scanned value or datum of the third section 12a to the first scanned value or datum of the portion 14 of the second data sequence 8 without any loss of scanned values or data and without any interruption.

In the event that one or a number of scanned values or data can be retrieved in a sequence of scanned values or data or a data sequence, as described hereinbefore, then, different data sequences can also be mutually synchronized on the basis of such procedure. This will be described hereinbelow with reference to FIGS. 7 to 10.

Figure 7:
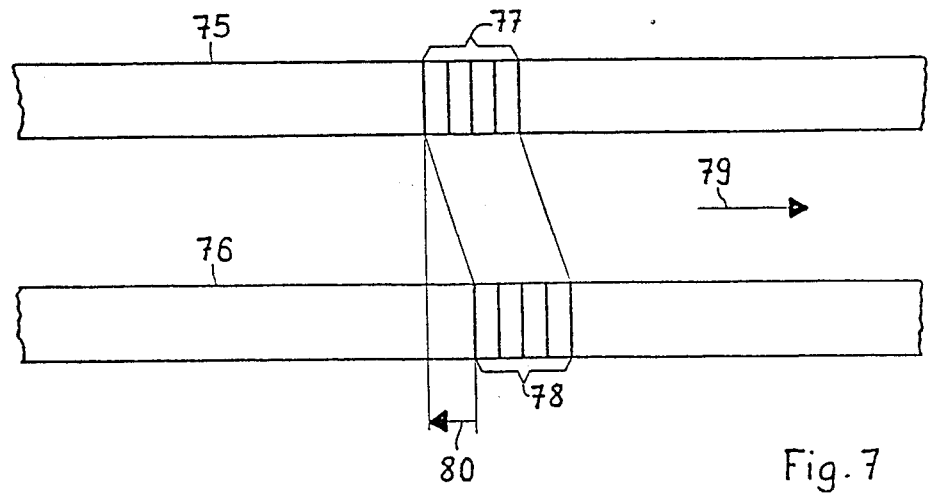
FIG. 7 is a schematic diagram showing two record or data carriers containing two mutually offset data sequences.

FIG. 7 shows in a schematic illustration a first record carrier 75 containing a first partial data sequence 77 and a second record carrier 76 containing a second partial data sequence 78. The two record carriers 75 and 76 are moved in the direction of the arrow 79. The first and second partial sequences 77 and 78 contain substantially conforming or identical scanned values or data and are determined and recognized or identified substantially in the manner as described hereinbefore. One of the two partial data sequences, namely the first partial data sequence 77 or the second partial data sequence 78, as the case may be, is selected in a random manner and constitutes a reference partial data sequence, whereas the other partial data sequence, namely the second partial data sequence 78 or the first partial data sequence 77, as the case may be, constitutes the aforementioned selected further partial data sequence which is selected from a predetermined number of second partial data sequences on the basis of optimum conformity with the reference partial data sequence. As a matter of example, the first or reference partial data sequence is assumed to be the first partial data sequence 77 which is randomly preselected, and the selected second partial data sequence is assumed to be the second partial data sequence 78. The two partial data sequences 77 and 78 are not in synchronism and, therefore, the second partial data sequence 78 is intended to be rearwardly displaced relative to the first or reference partial data sequence 77 by the required travel distance or the associated period of time 80. For this purpose, the offset of the second partial data sequence 78 relative to the first or reference partial data sequence 77 is determined and from the thus determined offset, there is derived a control signal, for example, for eliminating such offset. The detailed manner in which such offset is eliminated, will now be described hereinbelow.

Figure 8:
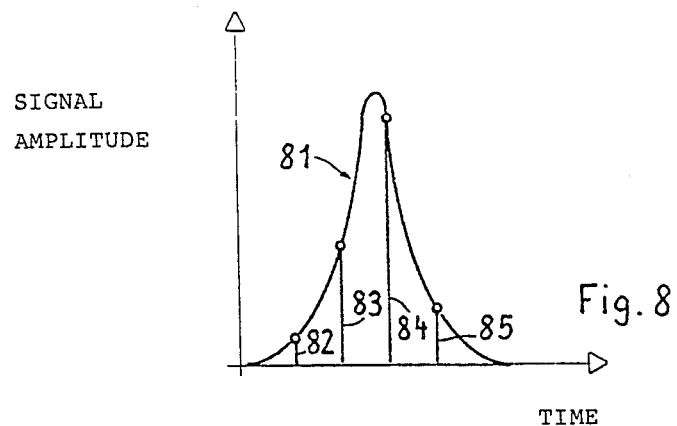
FIG. 8 is a schematic diagram of an analog signal showing the signal amplitude as a function of time and the associated scanned values or data which are obtained at a predetermined scanning frequency.

FIG. 8, as a matter of further explanation, shows the amplitude of a signal 81 as a function of time and the scanned values or data 82, 83, 84 and 85 which are obtained when the signal 81 is scanned at a predetermined scanning rate or frequency which determines the temporal spacing between the scanned values or data 82, 83, 84 and 85.

Figure 9:
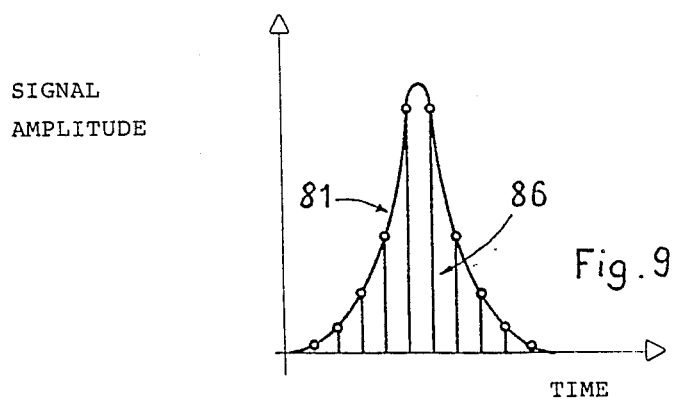
FIG. 9 is a diagram similar to FIG. 8 and shows the scanned values or data which are obtained at twice the scanning frequency.

In FIG. 9 the same signal 81 is plotted in analogous manner, i.e. as the signal amplitude as a function of time. The scanning rate or frequency as shown in FIG. 9 is twice as high as the scanning rate or frequency at which the signal 81 was scanned in FIG. 8. Therefore there is obtained twice the number of scanned values 86 at a temporal spacing which is half as wide as the spacing between the scanned values in FIG. 8. When the signal 81 is digitally recorded, that is in the form of a data sequence containing the scanned values or data 82, 83, 84 and 85 or 86, on two different record carriers like, for example, the record carriers 75 and 76 shown in FIG. 7, it is important in which manner the scanned values 82, 83, 84 and 85 or 86 are located relative to the signal 81.

In accordance with FIGS. 8 and 9 substantially conforming or identical scanned values or data of the signal 81 are only obtained when there is no temporal offset between the signal 81 and the scanning moments of time at which the scanned values or data 82, 83, 84 and 85 as well as 86 are scanned. This condition, however, can be hardly satisfied in practice. Therefore, one of the two signals 81 which originates from one of the record carriers, namely the first record carrier 75 or the second record carrier 76, as the case may be, is scanned at a higher scanning rate or frequency. The thus obtained sequence of scanned values or data 86 as illustrated in FIG. 9, then, can be analyzed using conventional correlation method, for a group of, for example, four scanned values or data which substantially conform or are identical with four scanned values or data in the signal 81 which is recorded on the other record carrier at the lower scanning frequency.

A second exemplary embodiment of the inventive apparatus 16 for carrying out synchronization between signals or scanned value or data sequences which are recorded on two record or data carriers, is illustrated as a schematic block circuit diagram in FIG. 10. For the following discussion, it will be assumed that a recorded signal or a recorded sequence of scanned values or data is present on a magnetic tape 90; such recorded signal or data sequence may constitute an audio-recording. This recording is now further recorded, namely on a video tape 91 and a disc 92, for example, a compact disc.

The video tape 91 is inserted into a video recorder 93 and played so that a video signal is delivered on the line or conductor 94 and an associated analog audio signal is delivered on the line or conductor 95. The disc 92 is inserted into a disc player 96 which delivers an analog audio signal via the line or conductor 97 and a corresponding digital audio signal via the line or conductor 98.

The problem to be solved thus can be defined as precisely synchronizing the analog audio signal present on the line or conductor 97 or the digital audio signal present on the line or conductor 98 with the analog audio signal which is present on the line or conductor 95. The video tape 91 and the disc 92, therefore, and in this particular example, correspond to respective ones of the first record carrier 75 and the second record carrier 76 shown in FIG. 7 and which record carriers, i.e. the data sequences recorded thereon are intended to be synchronized with respect to each other.

For this purpose, the apparatus illustrated in FIG. 10 contains a coarse synchronizer 99 which is connected to the video recorder 93 through a line or conductor 100 and to the disc player 96 via the line or conductor 101. Such lines or conductors 100 and 101 supply the coarse synchronizer 99 with time code signals or data which permit the coarse synchronizer 99 to carry out in conventional manner a coarse or approximate synchronization between the two record carriers 91 and 92, i.e. the scanned value or data sequences which are recorded on the video tape 91 and the disc 92. A time code adapter 102 is connected in circuit in a preselected one of the two lines or conductors 100 or 101 and serves to convert in conventional manner the time code related to one of the record carriers into the time code associated with the other record carrier. The coarse synchronizer 99 generates a control signal on a line or conductor 103 for controlling the drive of the disc player 96. Additionally, fine synchronization is performed in the manner which will now be described hereinbelow.

The digital output signal or audio signal generated by the disc player 96 on the line or conductor 98, is generated at a scanning rate or frequency of 44.1 kHz in case the disc player 96 constitutes a conventional compact disc player. For this reason, the analog audio signal which is generated by the video recorder 93 on the line or conductor 95, is scanned by means of an analog-to-digital converter 104 for generating a sequence of scanned value or data at a scanning rate or frequency which is a multiple of n×44.1 kHz with n being in the range of 1 to 8. The thus obtained signal or sequence of scanned values or data which are scanned at the n-fold higher frequency, is supplied to a circuit or generating means 105 for forming partial data sequences therefrom. For example, such circuit or generating means 105 contains a processor which is programmed such that a time window is opened at a predetermined frequency, for example, every 100 milliseconds. There is thus formed a partial data sequence which may serve as a reference partial data sequence, as well as a signal indicative of the position of the reference partial data sequence within the time window opened at the processor. The reference partial data sequences are delivered on the line or conductor 106 and the position indicating signal which is indicative of the position of the reference partial data sequence within the opened time window, is delivered on the line or conductor 107 to a suitable comparator or comparator circuit as will be discussed below.

The digital audio signal or data sequence generated by the disc player 96 on the line or conductor 98, is supplied to an interpolator 108 which constitutes, for example, a FIR (Finite Impulse Response) filter, i.e. an interpolation filter. As a result, the scanning rate or frequency is increased by a factor n in a manner which is known, for example, from scanning rate or frequency converters. This signal having the increased scanning frequency is delivered on a line or conductor 109 and serves as an output signal after passing through a digital-to-analog converter 110.

Furthermore, the signal or data sequence having the aforementioned comparator or comparator circuit 111. This comparator or comparator circuit 111 also receives the reference partial sequence from the circuit or generating means 105 which operates upon the scanned values or data sequence obtained from the video recorder 93 on the line or conductor 95 at the aforementioned multiple scanning rate or frequency of n×44.1 kHz. The comparator or comparator circuit 111 is operated in the aforedescribed manner for comparing the partial data sequences originating from the disc player 96 and obtained from the digital audio signal on the line or conductor 98 at the increased scanning rate or frequency by means of the interpolator or FIR filter 108, with the reference partial data sequence on the line or conductor 106. In effect, the comparator or comparator circuit 111 contains storage means for storing the reference partial data sequence received from the video recorder 93 through the line or conductor 106, and the further partial data sequences received from the disc player 96 through the interpolator or FIR filter 108 via the line or conductor 109. The comparator or comparator circuit 111 compares the reference partial data sequence and the further partial data sequences for determining the selected further partial data sequence which substantially conforms or is identical with the reference partial data sequence. Consequently, the comparator or comparator circuit 111 operates in a mode which is comparable to the operation of the random-access memory 47 and its associated components in the first exemplary embodiment of the inventive apparatus 16 as illustrated in FIG. 5 of the drawings in the instant application.

The comparator or comparator circuit 111, in addition to the storage means, contains computing means like, for example, a microprocessor. The storage means store the continuously arriving scanned values or data and is organized in accordance with the FIFO principle. The computing means take over from the storage means the scanned values or data in a manner such that each time an entire partial data sequence is transferred to the computing means. The comparing operation between each taken-over partial data sequence and the reference partial data sequence is carried out by the computing means or microprocessor. In case the comparison delivers a positive result, the storage addresses associated with the scanned values or data of the selected partial data sequence, which is obtained from the disc player 96 and substantially conforms or is identical with the reference partial data sequence, and the storage addresses of the reference partial data sequence are compared. Such comparison generates a signal indicative of the temporal or local offset between the reference partial data sequence and the selected partial data sequence which is identical with the reference partial data sequence. This temporal or local offset exists within the storage means and thus also between the two record carriers, namely the video tape 91 and the disc 92.

The offset-indicating signal is supplied via a line or conductor 112 to a correcting unit 113 which evens out excessive fluctuations in the offset-indicating signal. The thus obtained evened out offset-indicating signal is supplied via a line or conductor 114 to an adder or adding circuit 115 for adding the evened-out offset-indicating signal to the control signal which is supplied to the adder or adding circuit 115 via the line or conductor 103 from the coarse synchronizer 99. Consequently, a fine synchronization signal is superimposed upon the aforementioned coarse synchronization signal.

The combined synchronization signals are infed into the disc player 96 for controlling the operation of such disc player 96, particularly the synchronization of the disc player 96 relative to the video recorder 93. As a result, there is thus obtained fine synchronization between the analog audio signal generated by the disc player 96 on the lines or conductors 97 and 109 and the analog audio signal produced by the video recorder 93 on the line or conductor 95.

The foregoing description was generally based on the assumption that the comparison of the first or reference partial data sequence and the further partial data sequences is carried out in a manner such that maximum conformity or near identity is obtained between the individual scanned values or data of the aforementioned partial data sequences. However, it may occur that an individual scanned value or datum in one of the investigated partial data sequences either is missing or constitutes a faulty scanned value or datum. Nevertheless, the thus detected further partial data sequence would better conform with the first or reference partial data sequence than all of the other further partial data sequences which have been examined for conformity with the reference partial data sequence. Thus it would be unfortunate if also this defective but still substantially conforming further partial data sequence would be identified as non-conforming with the reference partial data sequence.

In order to take account of such defective but otherwise conforming further partial data sequences, there can be defined an index or characteristic value which defines or characterizes the relative conformity between two partial data sequences, particularly the reference partial data sequence and a further partial data sequence. Also, a threshold value can be predetermined for such index or characteristic value which indicates the limit above which any relative conformity will be interpreted or passed as absolute or maximum conformity or identity, that is to say, substantial conformity. The following formula can be used for determining such index or characterizing value I:

$$I = 1 - \frac{\sum_{i=0}^{slen-1} |s(i) - d(i)|}{slen - E(\text{diff})}$$

Therein s(i) designates the ith value of the reference partial data sequence, d(i) the ith value of the instant further partial data sequence under comparison, slen the length or time duration of the reference partial data sequence, and E(diff) the expected value of the sum given in the nominator of the formula.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A method of identifying a predetermined location in an audio and/or video data sequence recorded on a record carrier and processing the data sequence, comprising the steps of:
   preselecting from the data sequence, a reference partial data sequence containing a predetermined number of data;
   forming from said data sequence, a plurality of further partial data sequences each of which contains a predetermined number of data;
   comparing said preselected reference partial data sequence and each one of said predetermined number of further partial data sequences;
   during said step of comparing said preselected reference partial data sequence and each one of said plurality of further partial data sequences, determining in said plurality of further partial data sequences, a selected further partial data sequence having a predetermined degree of conformity with said preselected reference partial data sequence; and
   said step of determining said selected further partial data sequence entailing the step of detecting the location of said selected further partial data sequence within said data sequence and thereby identifying the predetermined location in said data sequence on said record carrier.

2. The method as defined in claim 1, further including the step of:
   storing said preselected reference partial data sequence.

3. The method as defined in claim 2, wherein:
   said step of preselecting said reference partial data sequence, entails reading a first reference partial data sequence from a first data sequence recorded on a first record carrier;
   during said step of reading said first reference partial data sequence, reading from said first data sequence a first data section containing said first reference partial data sequence;
   said step of storing said reference partial data sequence entailing the step of storing said first data section containing said first reference partial data sequence;
   reading from a second data sequence recorded on a second record carrier, a second data section containing a second reference partial data sequence;
   storing said first data section and said second data section;
   combining said stored first data section and said stored second data section to form a stored combined data section;
   said step of forming said plurality of further partial data sequences from said data sequence, entailing the step of forming a first plurality of further partial data sequences from said first data sequence recorded on said first record carrier;
   during said step of detecting the location of said selected further partial data sequence within said data sequence on said record carrier, detecting the location of a first selected further partial data sequence in said first data sequence and its location on said first record carrier;
   recording on said first record carrier substantially immediately following the location of said first selected further partial data sequence in said first data sequence, a remaining portion of said stored combined data section which substantially immediately follows said first reference partial data section;
   said step of detecting the location of said selected further partial data sequence within said data sequence on said record carrier further entailing the step of detecting the location of a second selected further partial data sequence within a second data sequence on a second record carrier; and
   upon recordal of said second reference partial data sequence of said second data section from said stored combined data section on said first record carrier, recording on said first record carrier said second data sequence starting from a location substantially immediately following said second selected further partial data sequence in said second data sequence recorded on said second record carrier.

4. The method as defined in claim 3, wherein:
   said step of reading said first data section from said first data sequence entails reading from said first data sequence recorded on said first record carrier, a terminal end section as viewed in the direction of relative movement of a first reading means and said first record carrier; and
   said step of reading said second data section from said second data sequence entailing the step of reading from said second data sequence recorded on said second record carrier, a starting end section as viewed in the direction of relative movement of a second reading means and said second record carrier.

5. The method as defined in claim 4, wherein:

said step of reading said terminal end section from said first data sequence recorded on said first record carrier entails reading said terminal end section plus a consecutive data section from said first record carrier;

said step of recording said starting end section from said second data sequence recorded on said second record carrier entailing the step of reading said starting end section plus a preceding data section from said second record carrier; and during said step of combining said stored first data section and said stored second data section, combining said terminal end section and said starting end section and deleting said consecutive data section and said preceding data section for forming said combined data section.

6. The method as defined in claim 1, further including the step of:

selecting the same predetermined number of data for said preselected reference partial data sequence and each one of said predetermined number of partial data sequences.

7. The method as defined in claim 1, further including the step of:

during said step of comparing said preselected reference partial data sequence and each one of said plurality of further partial data sequences, determining an index which is indicative of the degree of conformity between said preselected reference partial data sequence and each one of said plurality of further partial data sequences; and selecting a threshold value for said index above which threshold value the further partial data sequence under investigation is determined as said selected further partial data sequence having said predetermined degree of conformity with said preselected reference partial data sequence.

8. The method as defined in claim 1, wherein:

said step of preselecting said reference partial data sequence entails reading said preselected reference partial data sequence from a first data sequence recorded on a first record carrier;

said step of forming said plurality of further partial data sequences entailing the step of reading said plurality of further partial data sequences from a second data sequence recorded on a second record carrier;

said step of comparing said stored preselected reference partial data sequence and each one of said plurality of further partial data sequences entailing the step of comparing said stored preselected reference partial data sequence read from said first data sequence recorded on said first record carrier with each one of said plurality of further partial data sequences read from said second data sequence recorded on said second record carrier; and said step of detecting the location of said selected further partial data sequence entailing the step of detecting the location of said selected further partial data sequence within said second data sequence on said second record carrier in relation to the location of said preselected reference partial data sequence within said first data sequence on said first record carrier.

9. The method as defined in claim 8, wherein:

during said step of reading said preselected reference partial data sequence from said first data sequence recorded on said first record carrier, moving relative to each other a first reading means and said first record carrier;

said step of reading said preselected reference partial data sequence entailing the step of reading said preselected reference partial data sequence from said first data sequence recorded on said first record carrier within a predeterminate time window and determining a signal indicative of the position of said preselected reference partial data sequence within said predeterminate time window;

during said step of reading said plurality of further partial data sequences, from said second data sequence recorded on said second record carrier, moving relative to each other a second reading means and said second record carrier;

during said step of detecting the location of said selected further partial data sequence within said second data sequence on said second record carrier, detecting an offset between the position of said selected further partial data sequence read from said second data sequence and the position of said preselected reference partial data sequence read from said first data sequence within said predeterminate time window; and in the event of an offset between said preselected reference partial data sequence and said selected further partial data sequence, generating a control signal as a function of a detected offset for selectively controlling the relative movement of either one of (i) said first reading means and said first record carrier or (ii) said second reading means and said second record carrier in order to thereby provide a synchronized relationship between the relative movement of the first reading means and the first record carrier and the relative movement of said second reading means and said second record carrier.

10. The method as defined in claim 9, wherein:

said step of reading said preselected reference partial data sequence entails generating said preselected reference partial data sequence at a predetermined first scanning frequency; and during said step of reading said plurality of further partial data sequences, generating said plurality of further partial data sequences at a predetermined second scanning frequency which is higher than said predetermined first scanning frequency.

11. An apparatus for identifying a predetermined location in an audio and/or video data sequence recorded on a record carrier and processing the data sequence, comprising:

reading means for reading a preselected reference partial data sequence from the data sequence recorded on the record carrier;

said reading means containing moving means for moving relative to each other said reading means and said record carrier;

storage means connected to said reading means for storing said preselected reference partial data sequence;

said reading means further reading a plurality of further partial data sequences from said data sequence recorded on said record carrier;

comparator means operatively connected to said storage means and said reading means for comparing said preselected reference partial data sequence and each one of said plurality of further partial data sequences in order to thereby determine from said plurality of further partial data sequences, a selected further partial data sequence which has a predetermined degree of conformity with said preselected reference partial data sequence; and detecting means for detecting the location of said selected further partial data sequence within said data sequence and thereby identifying the predetermined location in said data sequence on said record carrier.

12. The apparatus as defined in claim 11, wherein:

said reading means contain first reading means for reading from a first data sequence recorded on a first record carrier, a first data section containing a first reference partial data sequence;

said reading means further containing second reading means for reading from a second data sequence recorded on a second record carrier, a second data section containing a second reference partial data sequence;

said storage means being connected to said first and second reading means and storing said first data section associated with said first data sequence and said second data section associated with said second data sequence;

storage control means controlling said storage means for joining to each other said first data section and said second data section and forming a combined data section;

said comparator means determining, as said selected further partial data sequence, from a plurality of further partial data sequences read from said first data sequence, a first selected further partial sequence having said predetermined degree of conformity with said first reference partial data sequence;

recording means associated with said first record carrier;

said detecting means interconnecting said comparator means and said recording means;

said recording means, upon detection of the location of said first selected further partial data sequence within said first data sequence on said first record carrier, recording from said storage means on said first record carrier substantially immediately following the location of said first selected further partial data sequence in said first data sequence on said first record carrier, a remaining portion of said combined data section which substantially immediately follows said first reference partial data section;

said comparator means further determining, as said selected further partial data sequence, from a plurality of further partial data sequences read from said second data sequence, a second selected further partial data sequence having said predetermined degree of conformity with said second reference partial data sequence; and said recording means, upon detection of the location of said second selected further partial data sequence within said second data sequence on said second record carrier, recording from said second record carrier on said first record carrier substantially immediately following the location of said second reference partial data sequence in said combined data sequence, said second data sequence staring from a location substantially immediately following said second selected further partial data sequence in said second data sequence recorded on said second record carrier.

13. The apparatus as defined in claim 12, wherein:
said storage control means are connected to said storage means for providing storage addresses to said storage means.

14. The apparatus as defined in claim 12, wherein:
said first reading means reading from said first data sequence, as said first data section, a terminal end section of said first data sequence as viewed in the direction of relative movement between said reading means and said first record carrier;

said second reading means reading from said second data sequence, as said second data section, a starting end section of said second data sequence as viewed in the direction of relative movement between said second reading means and said second record carrier.

15. The apparatus as defined in claim 14, wherein:
said first reading means reading from said first data sequence said terminal end section plus a consecutive data section;

said second reading means reading from said second data sequence said starting end section plus a preceding data section; and said storage control means controlling said storage means for combining said terminal end section of said first data sequence and said starting end section of said second data sequence to form said combined data section and for deleting said consecutive data sequence and said preceding data sequence during formation of said combined data section.

16. The apparatus as defined in claim 11, wherein:
said reading means contain first reading means for reading said preselected reference data sequence from a first data sequence recorded on a first record carrier;

said reading means further containing second reading means for reading said plurality of further partial data sequences from a second data sequence recorded on a second record carrier;

said comparator means comparing said stored preselected reference partial data sequence read from said first data sequence recorded on first record carrier and each one of said plurality of further partial data sequences read from said second data sequence recorded on said second record carrier; and said detecting means detecting the location of said selected further partial data sequence within said second data sequence recorded on said second record carrier in relation to the location of said preselected reference partial data sequence within said first data sequence recorded on said first record carrier.

17. The apparatus as defined in claim 16, wherein:
said moving means contain first moving means for moving relative to each other said first reading means and said first record carrier as well as second moving means for moving relative to each other said second reading means and said second record carrier;

said first reading means further containing time window generating means and position detecting means for generating a signal indicative of the position of said preselected reference partial data sequence within a predeterminate time window generated by said time window generating means;

said detecting means detecting an offset between the position of said selected further partial data sequence read from said second data sequence and the position of said reference partial data sequence read from said first data sequence within said predeterminate time window;

control means connected with said comparator means and said moving means; and said control means, as a function of a detected offset, generating a control signal for selectively controlling said relative movement of either one of (i) said first reading means and said first record carrier or (ii) said second reading means and said second record carrier in order to thereby provide a synchronized relationship between the relative movement of the first reading means and the first record carrier and the relative movement of the second reading means and the second record carrier.

18. The apparatus as defined in claim 11, wherein:

said comparator means contain means for determining an index indicative of the degree of conformity between said stored preselected reference partial data sequence and each one of said plurality of further partial data sequences; and said comparator means further containing threshold value generating means for defining a threshold value for said index above which threshold value the further partial data sequence under comparison is determined as said selected further partial data sequence having said predetermined degree of conformity with said preselected reference partial data sequence.

* * * * *